US008824454B2

United States Patent
Patel et al.

(10) Patent No.: US 8,824,454 B2
(45) Date of Patent: Sep. 2, 2014

(54) PEERING NETWORK FOR PARAMETER-BASED ROUTING OF SPECIAL NUMBER CALLS

(75) Inventors: Ashish Patel, Westminster, CO (US); Stephen Marc Meer, Longmont, CO (US); Michael Deweese, Brighton, CO (US); Carleton Anthony Smith, Westminster, CO (US)

(73) Assignee: West Corporation, Omaha, NE (US)

( * ) Notice: Subject to any disclaimer, the term of this patent is extended or adjusted under 35 U.S.C. 154(b) by 1662 days.

(21) Appl. No.: 11/457,600

(22) Filed: Jul. 14, 2006

(65) Prior Publication Data

US 2007/0115941 A1  May 24, 2007

Related U.S. Application Data

(60) Provisional application No. 60/729,673, filed on Oct. 24, 2005.

(51) Int. Cl.
H04L 12/66 (2006.01)
H04M 11/04 (2006.01)

(52) U.S. Cl.
USPC .............................. 370/352; 379/37; 379/45

(58) Field of Classification Search
CPC .............. H04L 29/06027; H04L 45/00; H04L 65/4007; H04L 67/20; H04M 7/006; H04M 7/0063; H04M 2242/04
USPC ............................... 370/352–356; 379/37, 45
See application file for complete search history.

(56) References Cited

U.S. PATENT DOCUMENTS

| | | |
|---|---|---|
| 5,323,444 A | 6/1994 | Ertz |
| 6,128,481 A | 10/2000 | Houde |
| 6,332,022 B1 | 12/2001 | Martinez |
| 6,678,357 B2 | 1/2004 | Stumer et al. |
| 6,744,858 B1 | 6/2004 | Ryan et al. |
| 6,771,742 B2 | 8/2004 | McCalmont et al. |
| 6,819,929 B2 | 11/2004 | Antonucci |
| 6,922,565 B2 | 7/2005 | Rhodes |
| 6,940,950 B2 | 9/2005 | Dickinson et al. |
| 6,963,557 B2 | 11/2005 | Knox |
| 7,042,985 B1 | 5/2006 | Wright |
| 7,079,627 B2 | 7/2006 | Crago et al. |
| 7,233,795 B1 * | 6/2007 | Ryden .......................... 455/445 |
| 2001/0021646 A1 | 9/2001 | Antonucci |

(Continued)

FOREIGN PATENT DOCUMENTS

WO  WO 01/76093 A1  10/2001
WO  2005084128 A2  9/2005

*Primary Examiner* — Asad Nawaz
*Assistant Examiner* — Joel Hamel

(57) ABSTRACT

A system and method that routes special number calls from communications devices, including VoIP communications devices, to an answering point that is selected based on a parameter. A peering network effects parameter-based routing of calls to a pre-assigned answering point, wherein the voice path and the signaling paths are set up simultaneously. A gateway in the peering network is connected to the service provider switch and receives special number calls. The gateway queries a pre-provisioned parameter server that determines call routing information for the particular communications device. The gateway then selects another gateway, or, optionally, a selective router access provider network, based on the routing information and delivers the call thereto. The other gateway or selective router access provider network is connected to a router in the destination network and delivers the call and the call parameters to the router.

23 Claims, 12 Drawing Sheets

(56) References Cited

U.S. PATENT DOCUMENTS

| | | |
|---|---|---|
| 2003/0063714 A1 | 4/2003 | Stumer et al. |
| 2003/0086539 A1 | 5/2003 | Mathis et al. |
| 2003/0109245 A1 | 6/2003 | Eisner et al. |
| 2003/0186709 A1 | 10/2003 | Burton et al. |
| 2004/0190497 A1 | 9/2004 | Knox |
| 2005/0083911 A1 | 4/2005 | Grabelsky et al. |
| 2005/0083912 A1* | 4/2005 | Afshar et al. ............... 370/352 |
| 2005/0135569 A1 | 6/2005 | Dickinson |
| 2005/0174991 A1 | 8/2005 | Keagy |
| 2005/0190892 A1 | 9/2005 | Dawson |
| 2005/0213716 A1 | 9/2005 | Zhu |
| 2005/0238142 A1 | 10/2005 | Winegarden |
| 2005/0282518 A1 | 12/2005 | D'Evelyn |
| 2006/0039539 A1 | 2/2006 | Goldman |
| 2006/0068753 A1 | 3/2006 | Karpen |
| 2006/0078095 A1 | 4/2006 | Crago |
| 2006/0233317 A1 | 10/2006 | Coster |
| 2006/0234726 A1 | 10/2006 | Ashley |
| 2007/0003024 A1* | 1/2007 | Olivier et al. ............... 379/45 |

* cited by examiner

PEERING NETWORK FOR PARAMETER-BASED ROUTING OF SPECIAL NUMBER CALLS

CROSS REFERENCE TO RELATED APPLICATION

This application is related to and claims the benefit of U.S. Provisional Patent Application No. 60/729,673, filed Oct. 24, 2005 and entitled "Peering Network for Parameter-Based Routing of Special Number Calls," which is incorporated herein in its entirety.

BACKGROUND OF THE INVENTION

The present invention is directed to providing inter-communications networks special number service, and, more specifically, to a peering network that routes a special number call from a communications device on a communications network to an answering point based on a parameter, regardless of the technology of communications device, regardless of the technology of the answering point and regardless of the technology of the communications networks.

For many decades, consumer communications services were limited to a line-based telephone connected to the public switched telephone network ("PSTN," also known as the "circuit switched" network) provided by a local telephone company. Now consumers not only have a choice of service providers, consumers also have several choices in communications technologies. Many consumers have cable television service, high-speed Internet service, wireless telephone service and plain old telephone service (POTS). Because of the redundancy of services, and because many providers have attractive combination packages, consumers are dropping their POTS lines in favor of VoIP telephone service (which may be combined with cable TV, high speed Internet access or both).

One advantage of VoIP telecommunication is that consumers can call anywhere in the world that has a connection to the Internet and a VoIP-enabled communications device. Further, a consumer can disconnect his or her VoIP-enabled communications device in one location, connect it in another location and receive service. One of the drawbacks to VoIP telecommunications is that, because a VoIP communications device can look exactly like a POTS telephone, and can, in fact, be a POTS telephone connected to a VoIP system through a VoIP interface, consumers expect VoIP telephony services to be exactly the same as the familiar POTS telephony services.

One of the largest problems that this consumer expectation causes is in the area of special number service. Such special service numbers include emergency number services. When a caller dials an emergency services number ("9-1-1" in the United States and Canada), he or she expects to be connected to an emergency services operator. Further, the caller expects that the emergency services operator he or she is connected to serves the emergency services zone ("ESZ") of the caller, which can dispatch local police, fire, ambulance, etc. to the location of the caller.

Prior to recent U.S. government mandates, many VoIP service providers did not provide support for emergency services numbers. Some VoIP subscribers did not realize that emergency services numbers were not supported, which caused many calls for help to go unanswered. This problem is further exacerbated by the fact that VoIP telephones can be moved at will. When a VoIP telephone is moved, there is no assurance that emergency service numbers are supported where the VoIP telephone is now connected and there is no assurance that the call will be answered by an emergency services operator in the ESZ where the VoIP telephone is now located.

Therefore, a problem in the art is that there is no simple, consistent system for routing a call from a VoIP telephone to an emergency services operator that serves the ESZ where the VoIP telephone is located.

SUMMARY OF THE INVENTION

This problem is solved and a technical advance is achieved in the art by a system and method that routes special number calls from communications devices, such as VoIP communications devices, to an answering point based on one or more parameters, such as location of the communications device. In accordance with this invention, a peering network effects parameter-based routing of calls to a pre-assigned answering point, through which the voice path and the signaling paths are set up simultaneously.

A first gateway in the peering network is connected to a service provider network, advantageously at a soft switch, router, media gateway, session boarder controller or switching system, to receive special number calls. The first gateway queries a pre-provisioned parameter server that determines call routing information for the particular parameter. The first gateway then selects a second gateway from a plurality of second gateways based on the routing information and delivers the call to the selected second gateway. The second gateway is connected to a selective router in the destination network and delivers the call and the call parameters to the selective router. The selective router routes the call to an answering point based on the call parameters. Alternatively, the first gateway may route the call to a selective router access provider network, which in turn routes the call to a selective router. Further alternatively, the second gateway may route the call to a selective router access provider network, which in turn routes the call to a selective router.

Importantly, this invention provides parameter-based routing of special number calls and effects a connection regardless of the communications technology of the calling communications device and the communications technology of the answering point. Thus, this invention provides parameter-based routing of special number calls from a first service provider network, including, but not limited to a VoIP service provider network, to any answering point connected to any communications network, including, but not limited to, the public switched telephone network.

Further advantageously, the parameter comprises the location of the VoIP communications device. The location of the VoIP communications device is used to determine the emergency services zone and the public safety answering point that serves that emergency services zone. Thus, this invention enable a VoIP service provider to provide special number calling for all of its VoIP customers, regardless of where the VoIP communications device is currently located and regardless of whether the service provider also provides the answering point.

BRIEF DESCRIPTION OF THE DRAWINGS

A more complete understanding of this invention may be obtained from a consideration of this specification taken in conjunction with the drawings, in which.

DETAILED DESCRIPTION

Figure 1:
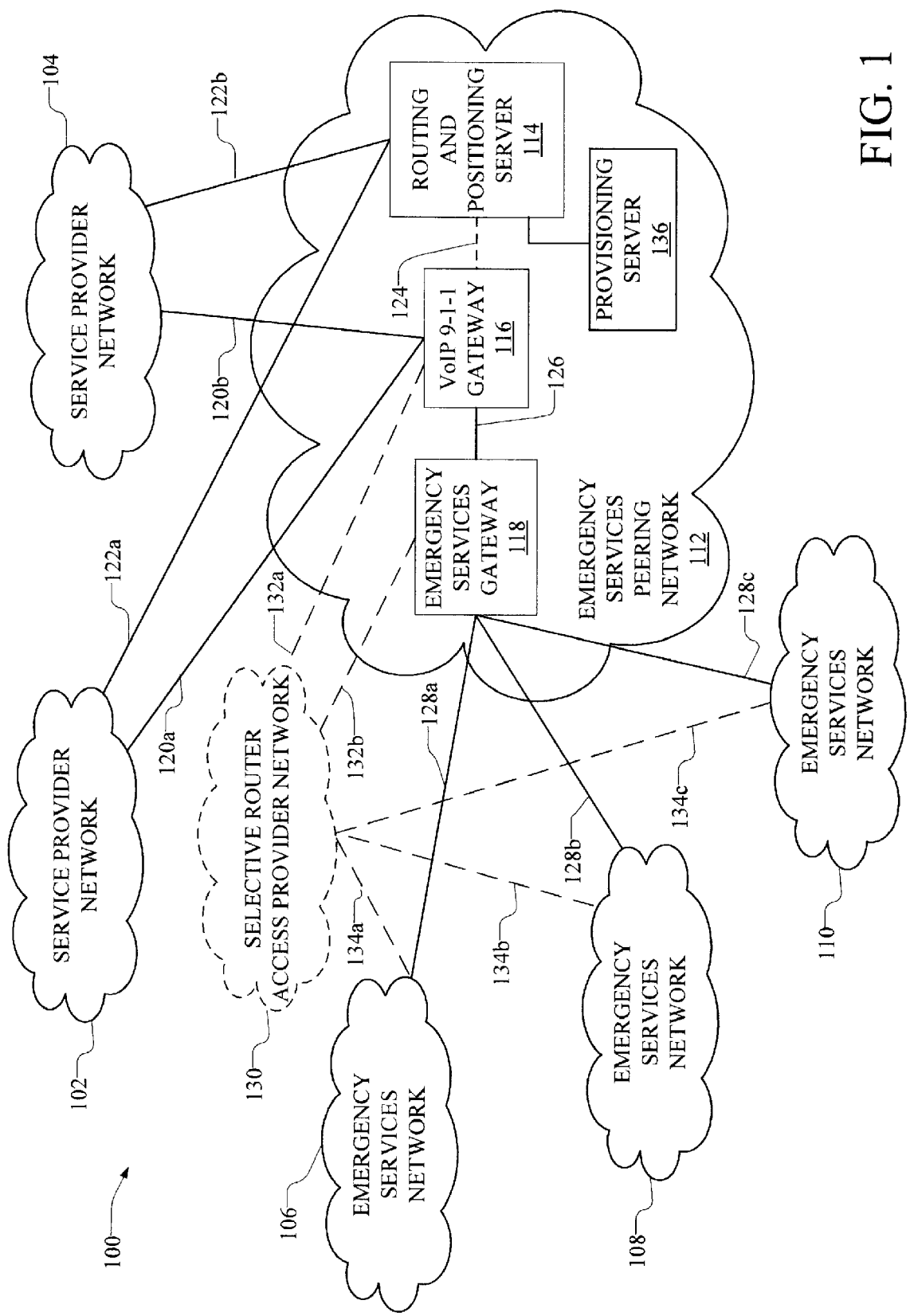
FIG. 1 illustrates an overview block diagram of a communications network in which an emergency services network in accordance with this invention operates.

The present invention relates to routing of a special number call to a pre-assigned answering point based on a parameter and regardless of whether the call crosses network boundaries. For purposes of this specification, "network boundaries" means the interface between two service provider networks (e.g., AT&T and Verizon) and the interface between networks of diverse technologies (e.g., VoIP networks and circuit switched networks). The various embodiments of this invention are described in terms of the special number call being an emergency services call, also referred to herein as a "9-1-1 call." As is known in the art, a 9-1-1 call is routed to a public safety answering point (PSAP), which, advantageously, service the emergency services zone (ESZ) where the calling communications device is located. The various embodiments of this invention are described in terms of the calling communications device comprising a VoIP communications device. Unlike POTS communications devices, a VoIP communications device may be moved from one location to another, but still retains the same identity to its network. Unlike wireless communications devices, a VoIP communications device is not in radio communications with cell sites, and thus cannot be tracked using radio communications techniques. Thus, providing emergency services calling for VoIP communications devices presents a new challenge to service providers.

This problem is address by an emergency services peering network in accordance with this invention. In the emergency services peering network, both the signaling path and the voice path of the emergency services call are handed off from the originating network to the emergency services peering network at the earliest possible time. The emergency services peering network then transports the call to an emergency services network that serves the ESZ wherein the calling communications device is located.

As will be described further, below, in connection with the various embodiments, the voice path and the signaling path move through the emergency service peering network approximately simultaneously. Thus, there is no time lag between signaling set up and actual call set up. It is known in the art that a caller who dials 9-1-1 is apt to hang up and try again if the call is not answered within seconds. This invention expedites call set up for emergency calling, which expedites aid and prevents repeated 9-1-1 calls, thus saving network resources.

While this invention is described in terms of emergency services or 9-1-1 call processing, one skilled in the art will realize that this invention is applicable to any special number call after studying this specification. Further, while this specification is described in terms of delivering a call from a VoIP communications device to a circuit switched emergency services network, one skilled in the art will appreciate that this invention may be modified to expedite call processing within or across many communications technologies after studying this specification. While this specification is described in terms of voice call processing within or across technologies, one skilled in the art will appreciate how to adapt this invention to expedite connections between other types of communications devices after studying this specification.

FIG. 1 comprises a generalized communications network 100 in accordance with a general embodiment of this invention. Communications network 100 includes a plurality of service provider networks, represented by service provider network 102 and service provider network 104. As is known in the art, service provider networks 102 and 104 support voice and data communications between and among communications devices connected to each respective service provider network.

Communications network 100 also includes a plurality of emergency services networks, represented by emergency service network 106, emergency service network 108 and emergency service network 110. As is known in the art, emergency service networks 106, 108 and 110 each comprises one or more selective routers and a plurality of public safety answering points. Each public safety answering point (PSAP) serves one or more emergency service zones (ESZ). An exemplary emergency service network 106 is described further, below, in connection with FIG. 2.

An emergency services peering network 112 in accordance with this invention interconnects service provider networks 102 and 104 with emergency service networks 106, 108 and 110. In this manner, any communications device in any service provider network connected to emergency services peering network 112 can be connected to any emergency services network. Such flexible interconnectivity is very important in today's world wherein a communications device may be moved around from place to place and network to network. In accordance with one aspect of this invention, a special number call, especially an emergency special number call, is routed to the emergency services network closest to the location of the calling communications device, regardless of the service provider network.

Emergency services peering network 112 generally comprises a routing and positioning server 114, optionally a VoIP 9-1-1 gateway 116 and an emergency service gateway 118.

Service provider network 102 is connected to VoIP 9-1-1 gateway 116 via communications link 120a and is connected to routing and positioning server 114 via communications link 122a. Service provider network 104 is connected to VoIP 9-1-1 gateway 116 via communications link 120b and is connected to routing and positioning server 114 via communications link 122b. Communications links 120a and 120b provide a voice path connection between service provider networks 102 and 104 and emergency services peering network 112, respectively. Communications links 122a and 122b provide a data connection between service provider networks 102 and 104 and emergency services peering network 112, respectively. As will be discussed further, below, communications links 120 and 122 may comprise time-division multiple (TDM) trunks, primary rate interface (PRI) trunks or data-only links (e.g., IP links). One skilled in the art will understand which type of trunk is appropriate to interconnect service provider networks, such as service provider networks 102 and 104 and emergency services peering network 112 after studying this specification.

Routing and positioning server 114, as will be discussed further, below, in the descriptions of the various embodiments, receives routing requests from service provider network 102 and service provider network 104 and delivers routing instructions in response thereto by way of communications links 122a and 122b, respectively. Additionally, routing and positioning server 114 receives and transmits VoIP-based voice traffic from service provider network 102 and service provider network 104 via communications links 122a and 122b, respectively, in accordance with another aspect of this invention, which will be described in more detail, below.

VoIP 9-1-1 gateway 116 terminates communications links 120a and 120b from service provider network 102 and service provider network 104, respectively. In one exemplary embodiment, voice communication within emergency services peering network 112 comprises VoIP-based communications. Thus, VoIP 9-1-1 gateway 116 terminates TDM trunks, PRI trunks, other communications links or any combination thereof and coverts voice signals between the format supported by communications links 120a and 120b to and from VoIP voice signals. Optionally, VoIP 9-1-1 gateway 116 may receive VoIP voice communication from routing and positioning server 114 via communications link 124 (illustrated herein in phantom) if routing and positioning server 114 receives voice communications. Alternatively, routing and positioning server 114 may be connected directly to emergency services gateway 118 (not shown in FIG. 1) as will be discuss further, below, in connection with FIG. 7.

Emergency service gateway 118 provides communications link termination between emergency services peering network 112 and emergency services network 106, emergency services network 108 and emergency services network 110 via communications links 128a, 128b and 128c, respectively. In accordance with this invention, communications link 128a, 128b and 128c are of a type that is compatible with the respective emergency services network to which it is connected. That is, if, for example, emergency services network 106 comprises a TDM network, then communications link 128a comprises a TDM trunk. If, for example, emergency services network 110 comprises a VoIP-based network, then communications link 128c comprises a data link.

In an alternative embodiment illustrated in FIG. 1, emergency service peering network 112 may not be connected directly to emergency services networks 106, 108 and 110. In this alternative embodiment, which is illustrated in phantom, emergency services peering network 112 is connected to a selective router access provider network 130 via communications link 132a or 132b. In accordance with one aspect of this alternative embodiment, VoIP 9-1-1 gateway 116 is connected to selective router access provider network 130 via communications link 132a. This configuration eliminates emergency services gateway 118 from emergency services peering network 112, thus providing a cost savings. This configuration is useful, for example, when all calls from emergency services peering network 112 are delivered to emergency services networks 106, 108 and 110 via selective router access provider network 130.

In accordance with another aspect of this alternative embodiment, emergency services gateway 118 is connected to selective router access provider network 130 via communications link 132b. This configuration is useful, for example, when some emergency services networks are accessible directly and some are accessible only through selective router access provider network 130.

Communications between VoIP 9-1-1 gateway 116 or emergency service gateway 118 and selective router access provider network 130 are VoIP-based; thus, communications links 132a and 132b comprises data links. One skilled in the art will realize that communications links 132a and 132b may comprise any type of trunk or data link that is compatible with selective router access provider network 130 and emergency services peering network 112.

Selective router access provider network 130, as its name implies, provides routing of emergency services calls from emergency services peering network 112 to any emergency services network to which it is connected. To this end, selective router access provider network 130 is connected to emergency services network 106 via trunk 134a, to emergency services network 108 via trunk 134b and to emergency services network 110 via trunk 134c. Each of trunks 134a, 134b and 134c comprises a trunk type that is compatible with each respective emergency services network.

To complete the description of FIG. 1, a provisioning server 136 provides new and updated location information to routing and positioning server 114. Provisioning server 136 receives new and updated location information from the various service provider networks that are connected to emergency services peering network 112 (such connection is not shown in FIG. 1, but is well known in the art). Provisioning server 136 will be described in more detail below in connection with FIG. 4.

Figure 2:
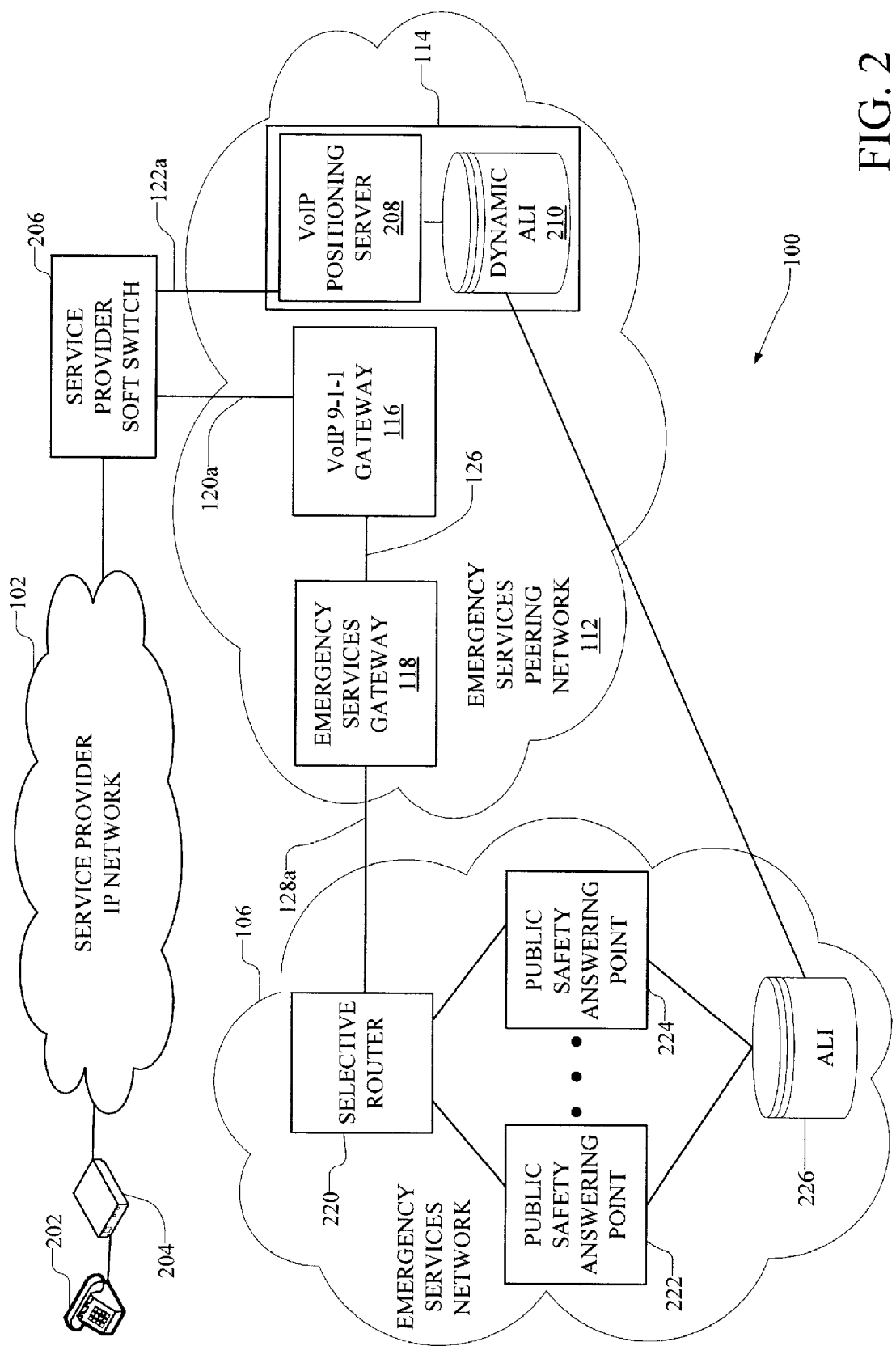
FIG. 2 illustrates a more detailed block diagram of the communications network of FIG. 1 in accordance with a first embodiment of the present invention.

FIG. 2 comprises a more detailed view of the components of communications network 100 in which an exemplary embodiment of this invention operates. In order to show some of the details of this exemplary embodiment, only service provider network 102 and emergency services network 106 are illustrated. Service provider network 104, emergency services network 108 and emergency services network 110 are to be considered as similar or identical to service provider network 102 and emergency services network 106, respectively, as described herein.

This exemplary embodiment of this invention is described in the context of a VoIP telephone making a special services call (a "9-1-1 call") to an emergency services number public safety answering point, or PSAP. Because routing a call to a local PSAP requires location-based parameters, this embodiment is described in the context of routing a call based on the location of the calling communication device. One skilled in the art will appreciate how to modify this invention to effect voice or data routing for predetermined destinations based on one or more parameters after studying this specification.

In the communications network 100 of FIG. 2, a voice over Internet protocol (VoIP) communications device is represented by VoIP-enabled telephone 202. VoIP communications device 202 is connected to a cable or digital subscriber line modem 204. Modem 204 effects an interface between VoIP communications device 202 and a service provider Internet protocol (IP) network 102. As is known in the art, the user of VoIP communications device 202 places a call by dialing a number in the same manner as used in the art for many years. Modem 204 receives the dialed digits, formats and sends a message to a service provider soft switch 206 through service provider IP network 102. The message includes the called number ("9-1-1" for an emergency services call in the U.S. and Canada) and an identification of the calling VoIP communications device 202, which may comprise its telephone number (TN), its MAC address or both.

Service provider soft switch 206 determines how to route the call based on the called number and the calling TN, as is known in the art. If the call is for another VoIP telephone in service provider IP network 102, then service provider soft switch 206 sends the IP address of the destination VoIP communications device to VoIP communications device 202, which initiates communication with the destination VoIP communications device via routers (not shown but well known in the art) in service provider IP network 102. If the call is to a destination not within service provider IP network 102, then service provider soft switch 206 routes the call to an appropriate gateway (also not shown but well known in the art) to another network (e.g., the PSTN, another service provider's IP network or the Internet). The term "soft switch" is used herein to mean a call control entity and a voice path delivery entity. Thus, service provider soft switch 206 may be one entity as illustrated herein, may comprise a soft switch and a media gateway or may comprises a plurality of functional elements that set up a call and deliver the voice path of the call to emergency services peering network 112.

In the past, if the user of VoIP telephone 202 dialed 9-1-1, service provider soft switch 206 was likely to end the call or to connect the call to an announcement. In accordance with this invention, however, the call may now be routed to the same local public safety answering point (PSAP) as if VoIP telephone 202 were a POTS telephone connected to the public switched telephone network (PSTN). To this end, service provider soft switch 206 delivers the call to emergency services peering network 112 in accordance with this invention.

According to the exemplary embodiment of FIG. 2, a VoIP positioning server 208 in routing and positioning server 114 is connected to service provider soft switch 206 via data link 122a. In this exemplary embodiment, link 122a comprises an IP link. One skilled in the art will appreciate that link 122a may be any form of signaling link or network after studying this specification.

VoIP positioning server 208 maintains a mapping of TN's to ESZ's, as will be described further, below, in connection with FIG. 4. VoIP positioning server 208 is connected to dynamic automatic location information (ALI) database 210, which maintains a mapping of TN's to currently registered addresses, so that it can deliver location and call back number (TN) information when queried by a regional ALI, as will be explained further, below.

As described above, emergency services peering network 112 includes a VoIP 9-1-1 gateway 116. VoIP 9-1-1 gateway 116 is connected to service provider soft switch 206 via one or more dedicated trunks or links 120a. Such links may be IP links or time-division multiplexed (TDM) links, including, but not limited to, dedicated lines and trunks. VoIP 9-1-1 gateway 116 may comprise a plurality of VoIP 9-1-1 gateways, may be connected to multiple service provider soft switches, or both.

In accordance with this exemplary embodiment, VoIP 9-1-1 gateway 116 is connected to one or more emergency services gateways, represented by emergency services gateway 118 via a private communications link 126, which, in this exemplary embodiment, comprises an IP communications link. Emergency services gateway 118 comprises the egress of emergency services peering network 112 and provides a connection to an emergency service network, such as emergency services network 106. Thus, emergency services gateway 118 is connected to one or more selective routers 220 in emergency services network 106 by one or more communications links 128a. Communications links 128a preferably comprise trunks or data links that are native to each selective router 220. For example, if selective router 220 is an existing selective router in the PSTN, then trunks 128a comprises one or more CAMA or enhanced multi-frequency trunks.

As is known in the art, selective router 220 is connected to a plurality of PSAP's, represented here by PSAP 222 and PSAP 224. PSAP's 222 and 224 are connected to regional automatic location information (ALI) database 226 that provides the PSAP's with location and other information regarding a caller. While this invention is described in terms of a PSTN selective router and PSAP's, it is within the ability of one skilled in the art to modify this invention to support, for example, VoIP-based selective routers, VoIP-based PSAP's, etc.

Figure 3:
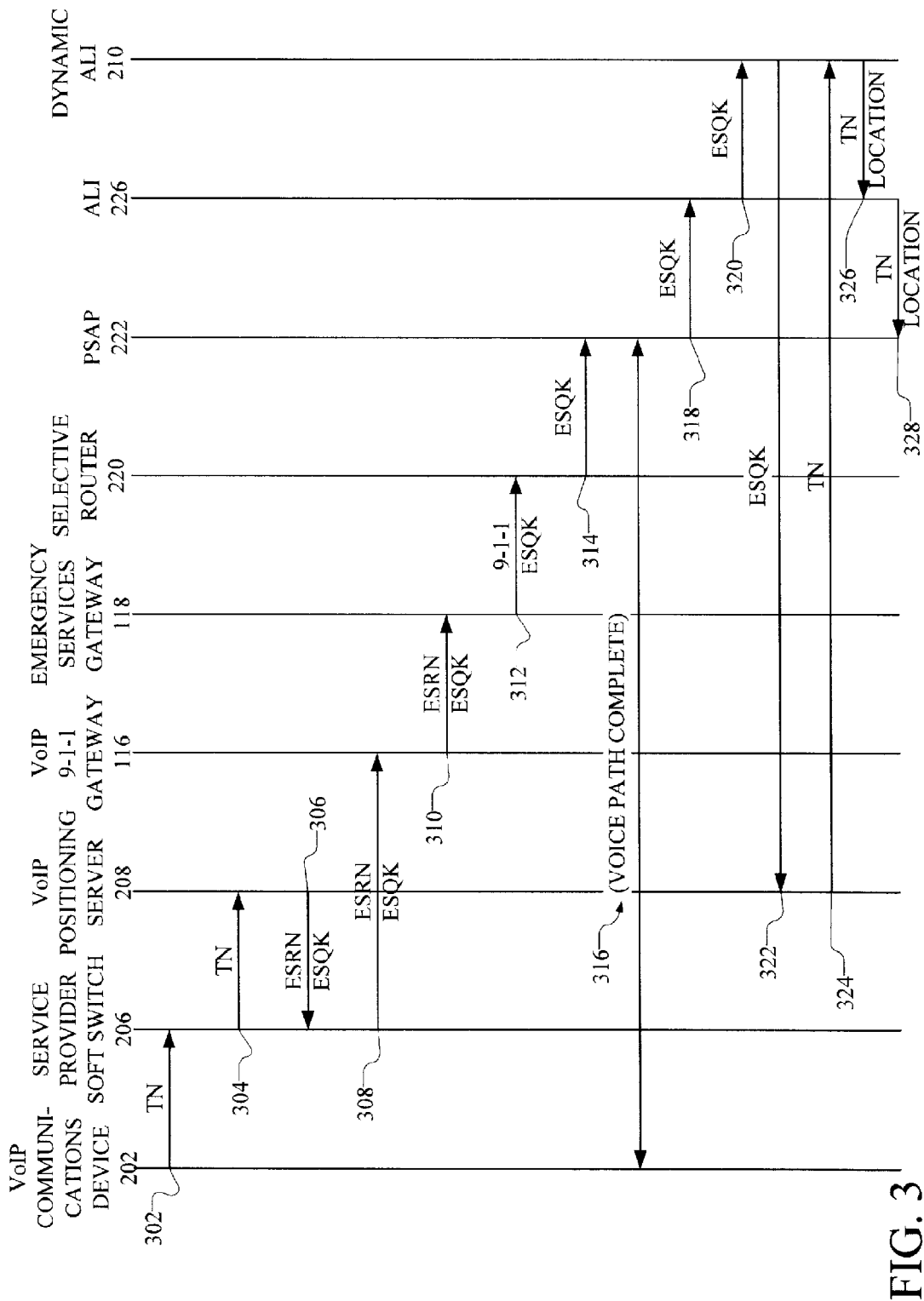
FIG. 3 is a call flow diagram of a special number call from a communications device to its local answering point in the context of the communications network of FIG. 2 in accordance with another aspect of this invention.

An emergency services call between VoIP telephone 202 and its local serving PSAP 222 is now described in the context of the call flow of FIG. 3 taken in conjunction with the communications network 100 of FIG. 2. While this exemplary embodiment is described in terms of the U.S. and Canadian 9-1-1 emergency services number, one skill in the art will understand how to modify the described embodiment of this invention to any emergency service number (e.g., 1-1-2) and to non-emergency numbers (e.g., 1-1-3).

The call flow of FIG. 3 begins at 302 wherein the user of VoIP communications device 202 dials "9-1-1" and the call is sent into service provider IP network 102. The initial message includes at least the TN of the VoIP communications device 202 and may also include its MAC or IP address. The call is received at service provider soft switch 206 wherein digit analysis is performed. In step 304, service provider soft switch 102 determines that the call is an emergency services (9-1-1) call and requests routing instructions from VoIP positioning server 208, passing the TN of the calling communications device.

VoIP positioning server 208 determines the currently-registered location of VoIP communications device 202 and, in step 306, delivers an emergency services routing number (ESRN) and an emergency services query key (ESQK). An ESRN comprises a ten-digit number, resembling a telephone number, that uniquely identifies a selective router. An ESRN may be considered the "telephone number" of the selective router. For each ESRN, there is a plurality of ESQK's that identify a specific PSAP connected to the selective router. Each PSAP has a plurality of ESQK's so that multiple calls can be routed to a PSAP at the same time. Each ESQK serves as a key that identifies the TN currently associated with the ESQK. Thus, VoIP positioning server 208 stores the TN of VoIP communications device 202 associated with the assigned ESQK.

At step 308, all of the information necessary to route the emergency call from VoIP communications device 202 to its local PSAP, which in this exemplary embodiment is PSAP 222, has been determined. From step 308 until the emergency services call is complete to PSAP 222, and in direct contradistinction to the prior art, the voice path and the signaling path flow through emergency services peering network 112 substantially simultaneously. This means that, as each network element is reached, a voice path is established between that network element and VoIP communications device 202. In this manner, an emergency services call is set up significantly faster than in the prior art. Optionally, recorded messages reassuring the caller that the call is being connected and not to hang up may be played at any network element during call completion.

At step 308, service provider soft switch 206 connects the emergency services call to VoIP 9-1-1 gateway 116 via communications link 120a and passes the ESRN and ESQK. VoIP 9-1-1 gateway 116 selects emergency services gateway 118 from the one or more emergency services gateways to which it is connected, based on the ESRN. VoIP 9-1-1 gateway 116 then extends the voice path of the call to emergency services gateway 118 via communications link 126 and forwards the ESRN and ESQK at step 310.

At step 312, emergency services gateway 118 selects a selective router from the plurality of selective routers to which it is connected, based on the ESRN. In this exemplary embodiment, the ESRN directs emergency services gateway 118 to select selective router 220 in emergency services network 106. Emergency services gateway 1118 connects the voice path to selective router 220 via communications link 128a and forwards 9-1-1 as the called number and the ESQK as the calling number (also known as "ANI"). Thus, the call appears to be just another 9-1-1 call to selective router 220 in emergency service network 106.

In the prior art, a selective router uses the ANI of the calling telephone to determine which PSAP to route the call to. In this exemplary embodiment, however, selective router 220 uses the ESQK assigned to the call by VoIP positioning server 208 to select the PSAP to route the call to. Thus, in step 314, selective router 220 connects the emergency services call from VoIP communications device 202 to PSAP 222 via dedicated trunks, such as CAMA trunks, as practiced in this art for many years.

Step 316 emphasizes that the voice path between VoIP communications device 202 and its local PSAP 222, is now complete. It is important to note that, in accordance with this invention, the voice path is extended as communication paths are selected by the various network elements.

Returning now to FIGS. 2 and 3, PSAP 222 requests information from regional ALI database 226 regarding the ESQK at step 318. ALI 226 recognizes the ESQK as a special case ANI associated with dynamic ALI 210. In step 320, ALI 226 requests information associated with the ESQK from dynamic ALI 210. Dynamic ALI 210 requests the TN associated with the ESQK from VoIP positioning server 208 in step 322. The TN of VoIP communications device 202 is returned to dynamic ALI 210 in step 324. Dynamic ALI 210 delivers the actual TN and the location of VoIP telephone 202 back to ALI 226 in step 326. Finally, in step 328, ALI 226 delivers the actual TN and location of VoIP communications device 220 to PSAP 132.

Figure 4:
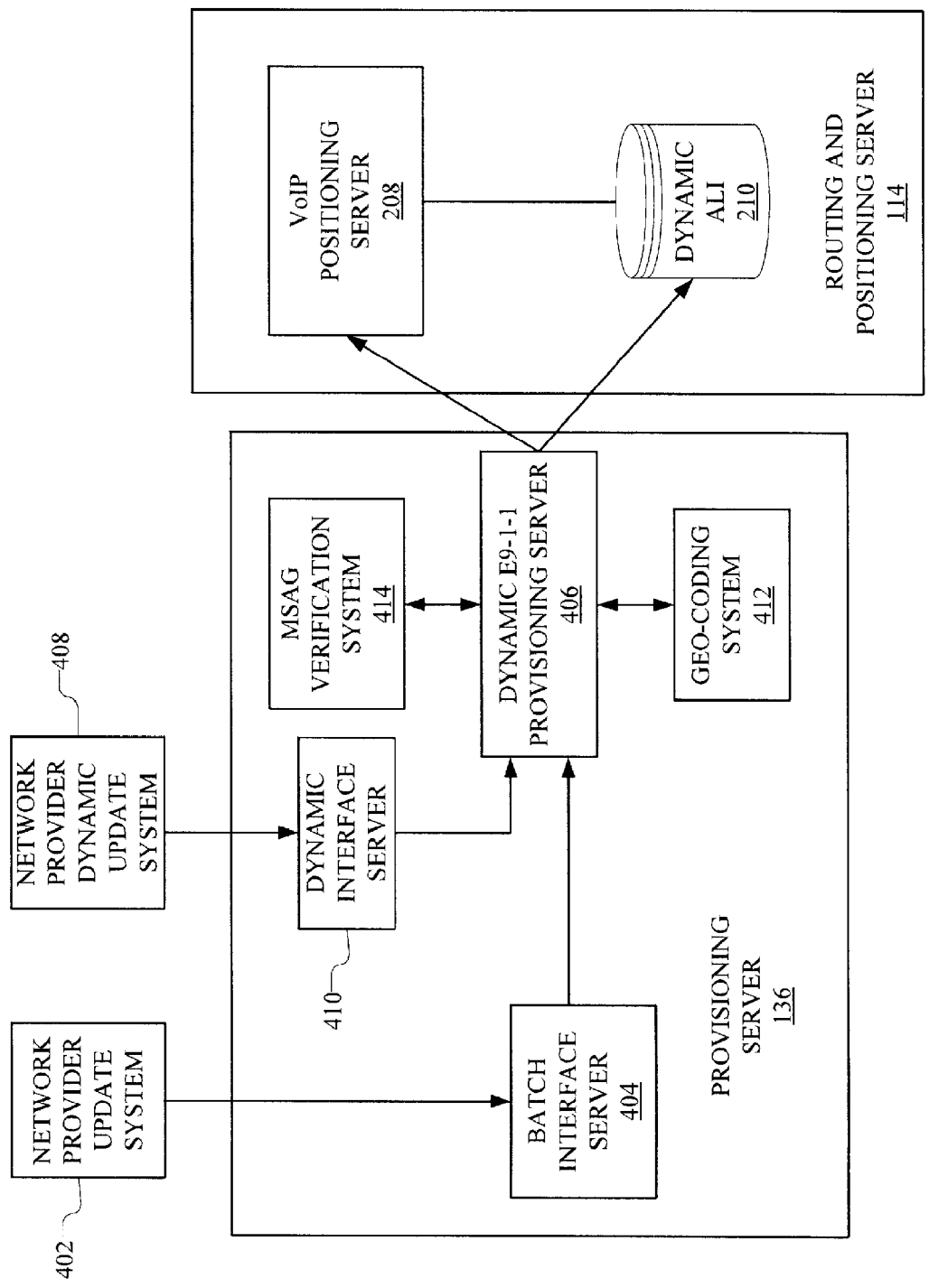
FIG. 4 illustrates a block diagram of the provisioning system of FIG. 1 in accordance with one aspect of this invention.

Turning now to FIG. 4, a provisioning server 136, used to provision VoIP positioning server 208 and dynamic ALI 210, is illustrated in block diagram. Periodically (e.g., every night), a VoIP network service provider accumulates a plurality of updates regarding VoIP service. The VoIP service provider loads such updates into a batch system 402. These updates include, but are not limited to, a TN and an address or other indicia of location of the VoIP telephone associated with that TN. These updates are sent to batch interface server 404 of provisioning server 136, in accordance with this exemplary embodiment. Batch interface server 404 pre-processes the records according to the desired format. Batch interface server 404 delivers the records to dynamic E9-1-1 provisioning server 406.

In accordance with another aspect of this invention, the network service provider requires or permits the users of VoIP telephony devices to update the records associated with the users' TN's, on, for example, a service provider web site. Such dynamic updating may be required when, for example, the user of a VoIP telephony device moves the device. These updates must be processed immediately so that the user may make an emergency services call and have the call routed properly.

To this end, a network service provider dynamic update system 408 receives the updates and forwards them on a real-time basis to a dynamic interface server 410 in provisioning server 136. Dynamic interface server 410 pre-processes the records and forwards the updated records to dynamic E9-1-1 provisioning server 406.

When dynamic E9-1-1 provisioning server 406 receives pre-processed records from either batch interface server 404 or dynamic interface server 410, it geo-codes the address or other location information in geo-coding system 412. Further, dynamic E9-1-1 provisioning server 406 verifies that there is an MSAG-verifiable address by sending the address or location information to MSAG verification system 414.

The records thus geo-coded and verified are then sent to VoIP positioning server 208 and dynamic ALI 210 and used for call routing (VoIP positioning server 208) and location information display (dynamic ALI 210), as described above. This system for provisioning VoIP positioning server 208 and dynamic ALI 210 has been described in the context of the 9-1-1 environment. One skilled in the art will realize how to modify provisioning server 136 for other applications. For example, if location information and TN are available automatically, then dynamic E9-1-1 provisioning server 406 can perform the MSAG verification and geo-code the records without user intervention.

Figure 5:
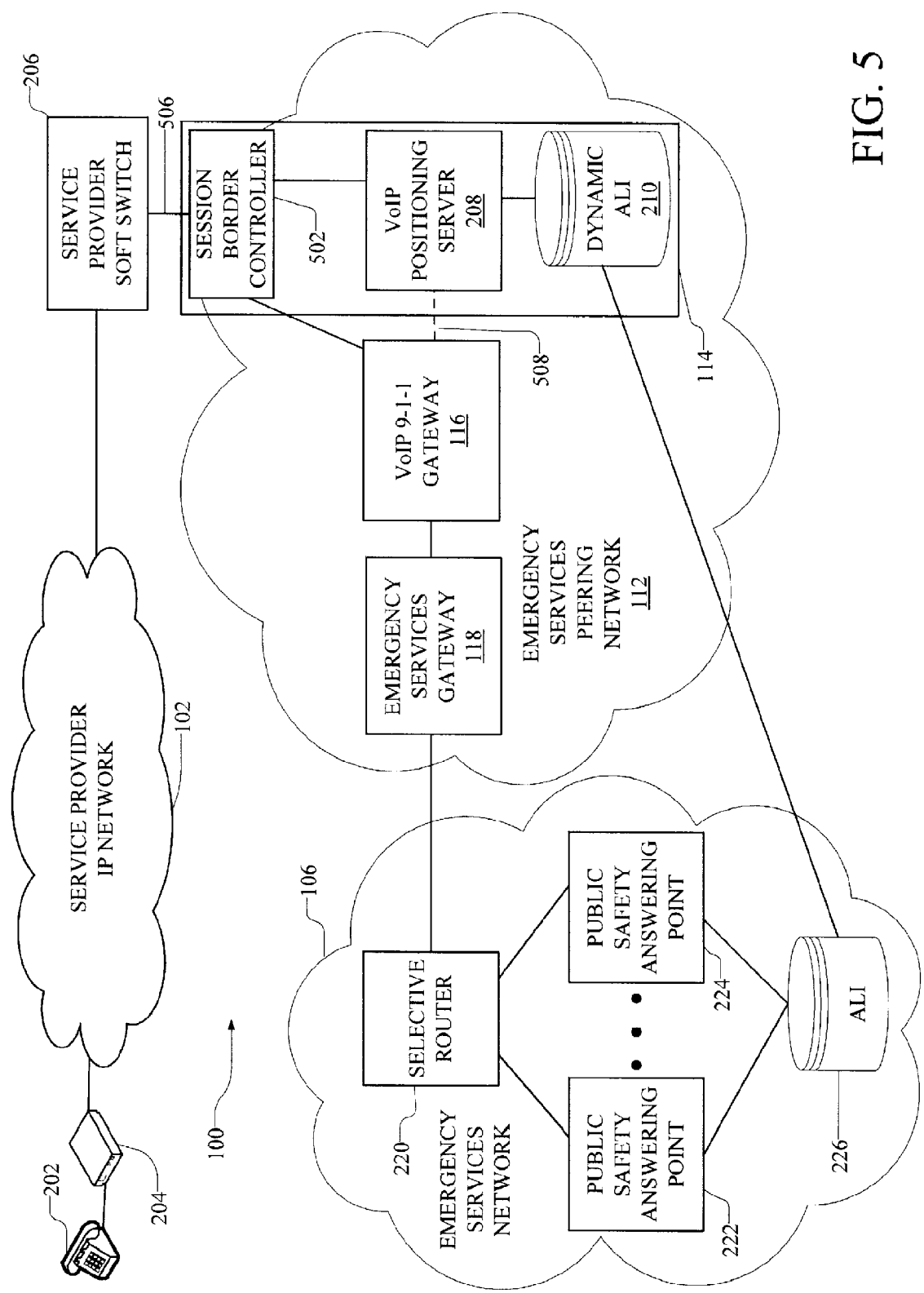
FIG. 5 illustrates a more detailed block diagram of the communications network of FIG. 1 in accordance with another embodiment of the present invention.

Turning now to FIG. 5, another exemplary embodiment of the present invention is shown, in the context of communications network 100. In this exemplary embodiment, communications network 100 includes a routing and positioning server 114 in a configuration that is different from routing and positioning server 114 of FIG. 2. Specifically, routing and positioning server 114 includes a session border controller (SBC) 502, which interconnects service provider soft switch 206 to VoIP gateway 116 and to VoIP positioning server 208.

Figure 6:
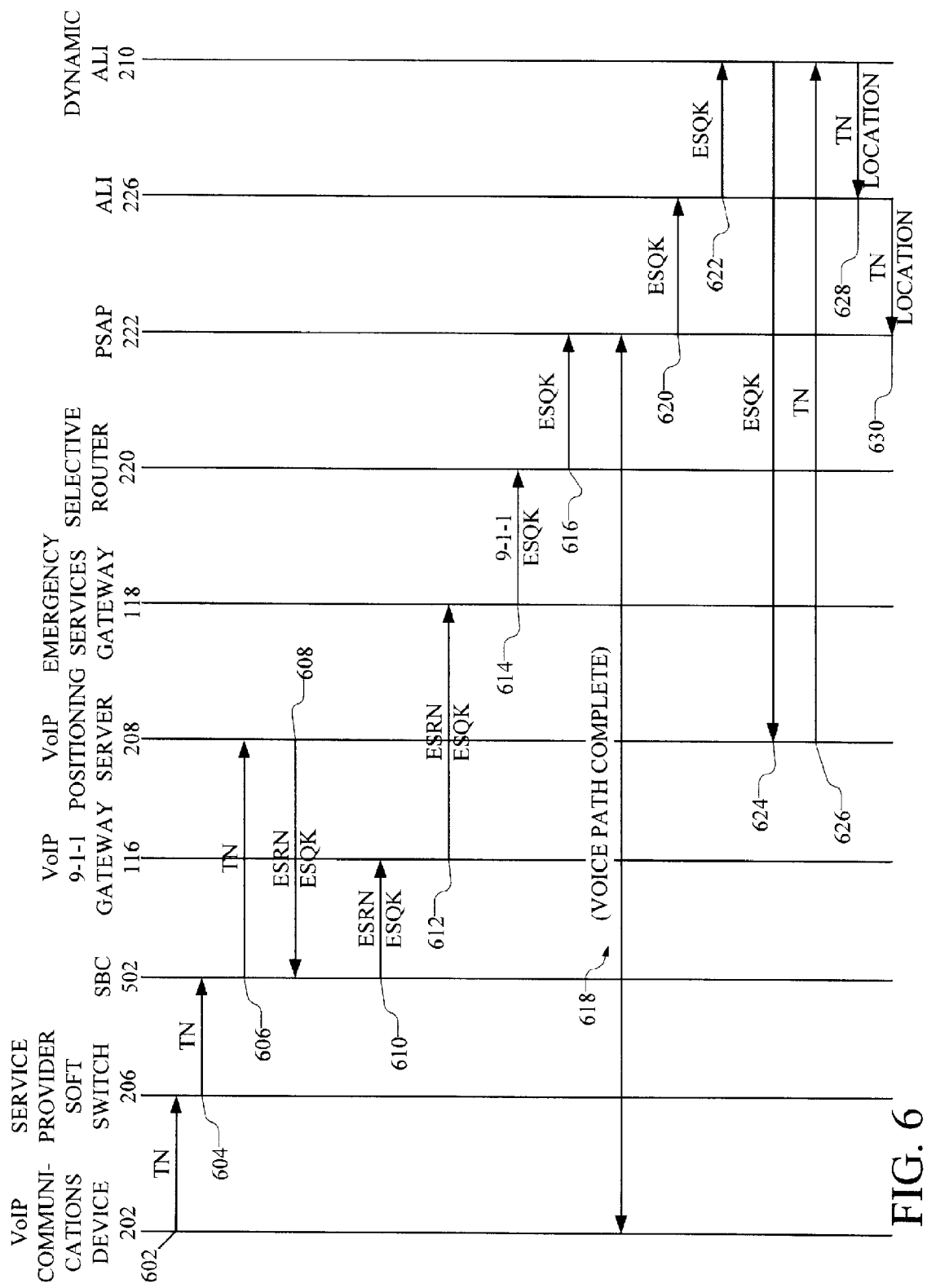
FIG. 6 is a call flow diagram of a special number call from a communications device to its local answering point in the context of FIG. 5, in accordance with a further aspect of this invention.

The operation of communications network 100 of FIG. 5 will now be described in the context of the call flow of FIG. 6. In step 602, VoIP communications device 202 initiates an emergency services call by sending the called number (9-1-1), calling number (TN) and, optionally, its MAC or IP address through service provider IP network 102 to service provider soft switch 206. In this exemplary embodiment, service provider soft switch 206, responsive to 9-1-1, sets up and delivers the call (including the voice path) via an IP communications link 506 to session border controller 502 in step 604. Session border controller 502 determines how to route the call by querying VoIP positioning server 208 with the TN (and optionally the MAC or IP address) of VoIP communications device 202 in step 606. VoIP positioning server 208 responds with an ESRN and an ESQK in step 608.

Session border controller 502 sets up and delivers the call to VoIP 9-1-1 gateway 116 in step 610, and forwards the ESRN and ESQK. Alternatively, session border controller 502 may forward the call to VoIP 9-1-1 gateway 116 immediately upon receipt from service provider soft switch 206 and VoIP 9-1-1 gateway 116 queries VoIP positioning server 208 via communications link 508 (shown in phantom). In either alternative, in step 612, VoIP 9-1-1 gateway 116 selects an emergency service gateway 118 based on the ESRN and forwards the call, including the ESRN and ESQK, thereto.

Emergency services gateway 118 routes the call to a selective router 220 in emergency services network 106 based on the ESRN, and delivers 9-1-1 as the called number and ESQK as the calling number in step 614. Selective router 220 routes the call to PSAP 222 based on the ESQK in step 616, and delivers the ESQK. At step 618, the voice path between VoIP communications device 202 and PSAP 222 is complete.

PSAP 222 queries its ALI database 226 with the ESQK in step 620. ALI database 226 queries dynamic ALI 210 with the ESQK in step 622, which then queries VoIP positioning server 208 with the ESQK in step 624. In step 626, VoIP positioning server 208 delivers the TN of VoIP communications device 202 back to dynamic ALI 210. Dynamic ALI 210 delivers the TN and location of VoIP communications device 202 back to ALI 226 in step 628 and ALI 226 delivers the TN and location of VoIP communications device 202 to PSAP 222 in step 630.

Figure 7:
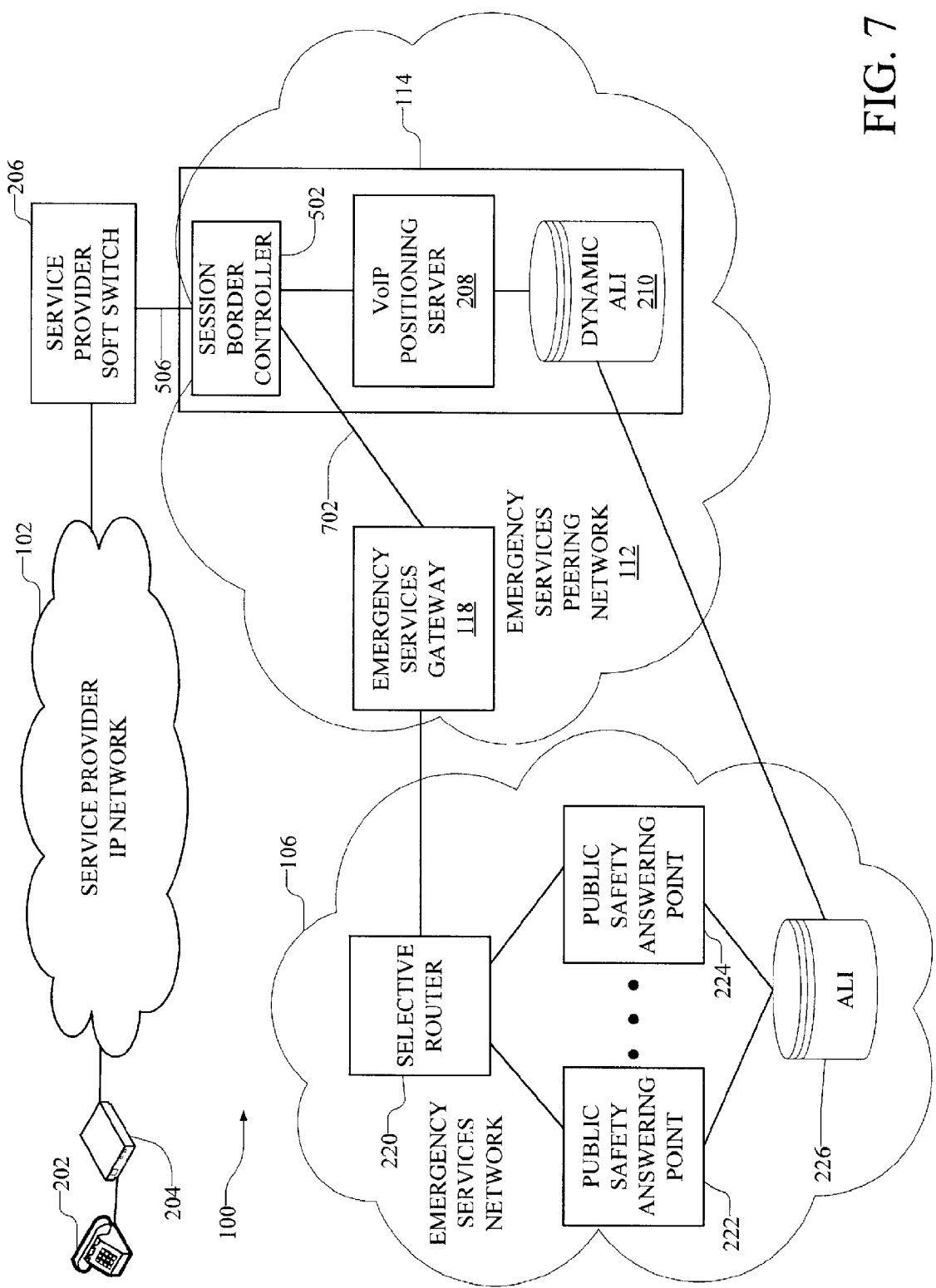
FIG. 7 illustrates a more detailed block diagram of the communications network of FIG. 1 in accordance with a further exemplary embodiment of this invention.

Turning now to FIG. 7, a further embodiment of this invention is shown in the context of communications network 100. In this further exemplary embodiment, emergency services peering network 112 comprises routing and positioning server 114 (which includes session border controller 502, VoIP positioning server 208 and dynamic ALI 210) and emergency services gateway 118. As will be described further, below, the operations of VoIP 9-1-1 gateway 116 (of FIGS. 2 and 4) are performed by session border controller 502, emergency service gateway 118 or shared by both.

Figure 8:
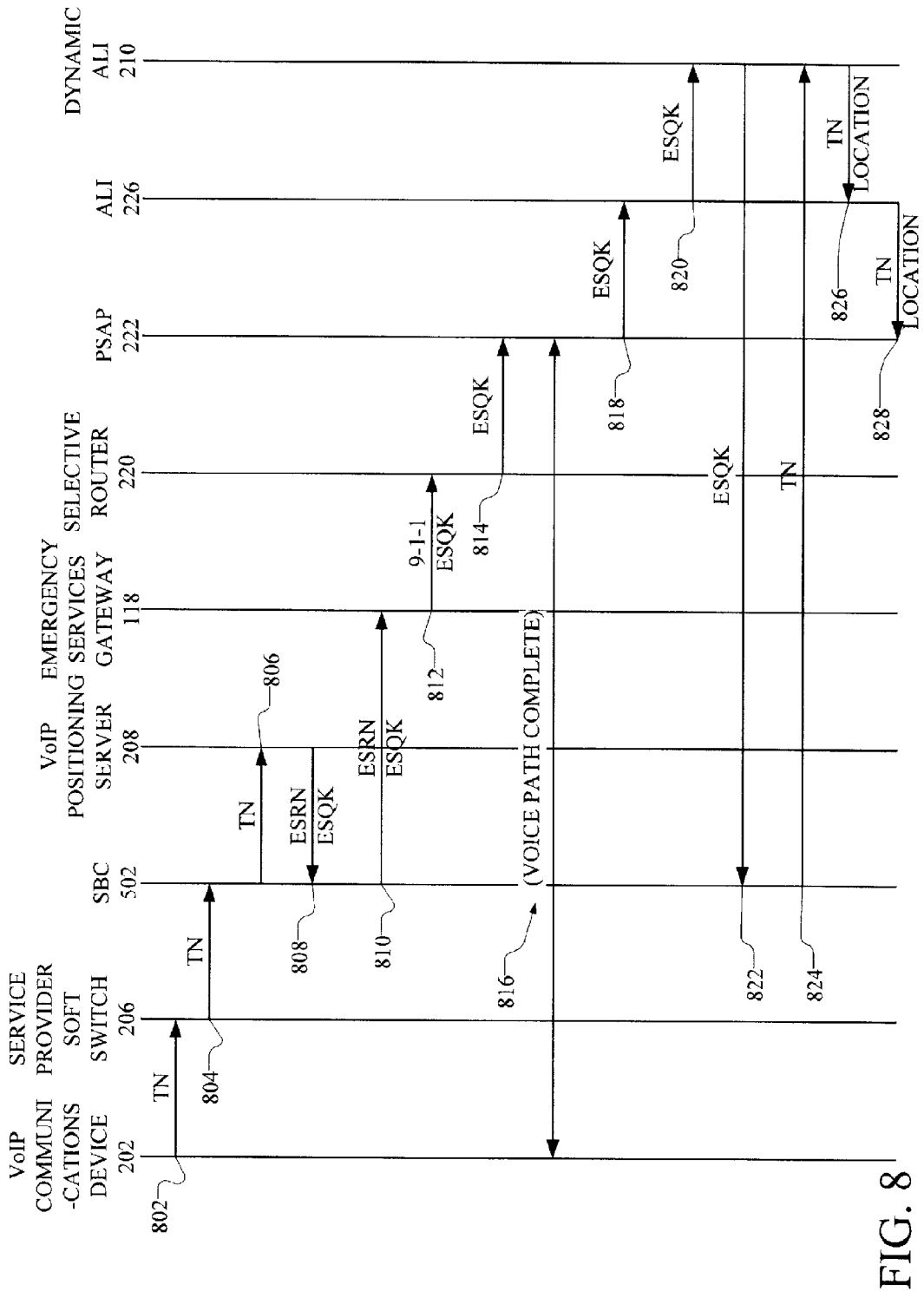
FIG. 8 is a call flow diagram of a special number call from a communications device to its local answering point in the context of FIG. 7, in accordance with yet a further aspect of this invention.

The operation of communications network 100 of FIG. 7 will now be described in the context of the call flow of FIG. 8. In step 802, VoIP communications device 202 initiates an emergency services call by sending the called number (9-1-1), calling number (TN) and, optionally, its MAC or IP address to service provider soft switch 206. In this exemplary embodiment, service provider soft switch 206 sets up and delivers the call via an IP communications link 506 to session border controller 502 in step 804. Session border controller 502 determines how to route the call by querying VoIP positioning server 208 with the TN and optionally the MAC or IP address of VoIP communications device 202 in step 806. VoIP positioning server 208 responds with an ESRN and an ESQK (as in FIG. 2) in step 808.

Session border controller 502, in step 810, sets up and delivers the call to an emergency service gateway 118 based on the ESRN and extends the call, including the ESRN and ESQK, thereto. The communications link 702 between session border controller 502 and emergency services gateway 118 is, in this exemplary embodiment, an IP link. Connection 702 may also be TDM, EMF, SS7 or any other communications medium that can deliver voice and signaling.

Emergency services gateway 118 routes the call to selective router 220 based on the ESRN, and delivers 9-1-1 as the called number and ESQK as the calling number in step 812. Selective router 220 routes the call to PSAP 222 based on the ESQK in step 814. In step 816, the voice path between VoIP communications device 202 and PSAP 222 is complete. PSAP 222 queries its ALI database 226 using the ESQK in step 818. ALI database 226 queries dynamic ALI 210 with the ESQK in step 820, which then queries VoIP positioning server 208 with the ESQK in step 822. In step 824, VoIP positioning server 208 delivers the TN of VoIP communications device 202 back to dynamic ALI 210. Dynamic ALI 210 delivers the TN and location of VoIP communications device 202 back to ALI 226 in step 826 and ALI 226 delivers the TN and location of VoIP communications device 202 to PSAP 222 in step 828.

Figure 9:
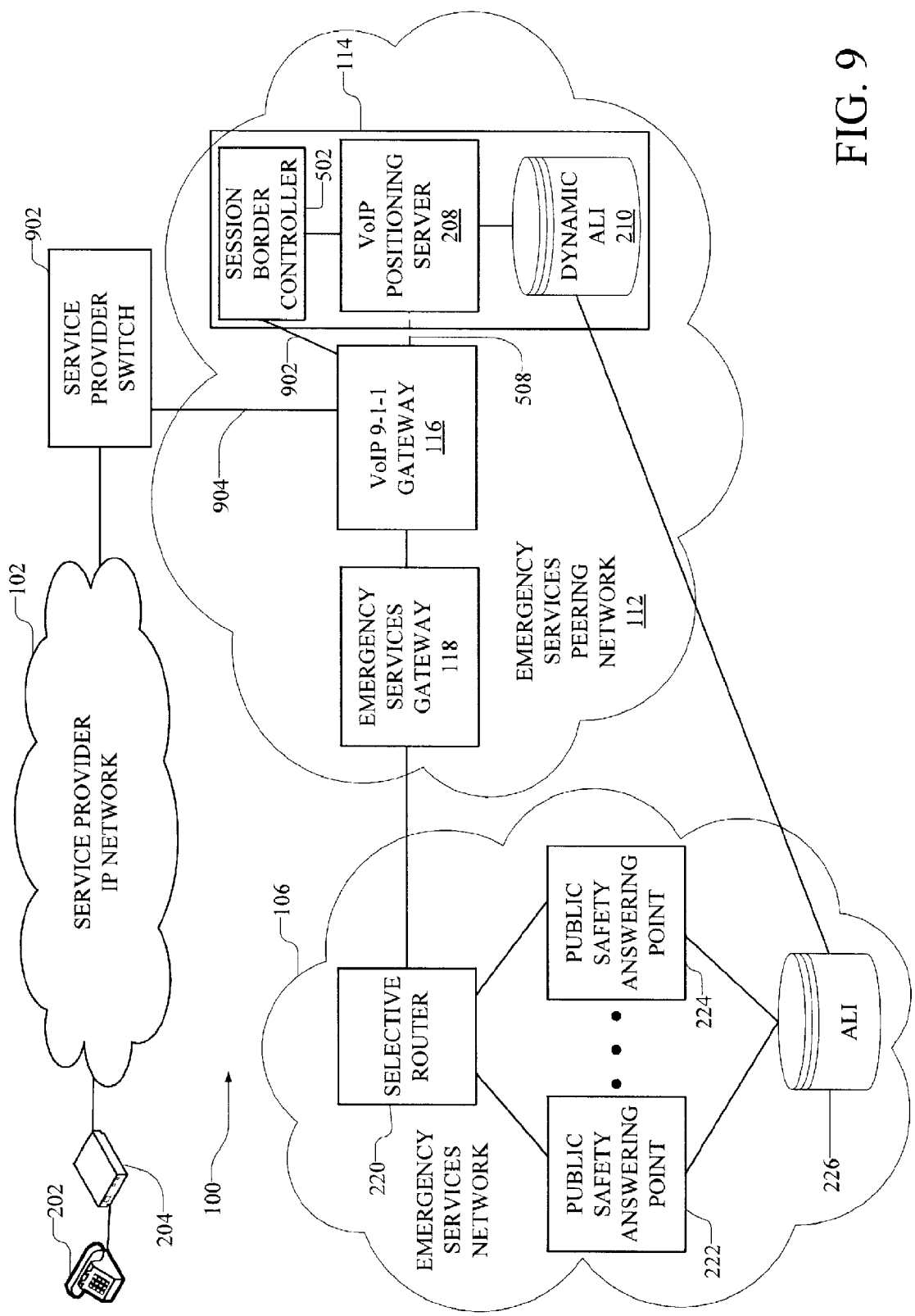
FIG. 9 illustrates a more detailed block diagram of the communications network of FIG. 1 in accordance with yet another exemplary embodiment of this invention.

Turning now to FIG. 9, another further embodiment of this invention is shown, in the context of communications network 100. In communications network 100, service provider switch 902 may comprise a soft switch as described above, or may comprise a TDM switching system or, importantly, a remote terminal connected to a TDM switching system. Some VoIP service providers connect their respective VoIP networks to the PSTN at a remote terminal connected to a TDM switching system. In such systems, a VoIP call to or from the PSTN appears to be a TDM call to the TDM switching system, thus facilitating interconnection of networks. In the embodiment of FIG. 9, service provider switch 902 is connected to VoIP 9-1-1 gateway 116 by a TDM trunk 904. Alternatively, trunk 904 may comprise a PRI or IP connection.

Figure 10:
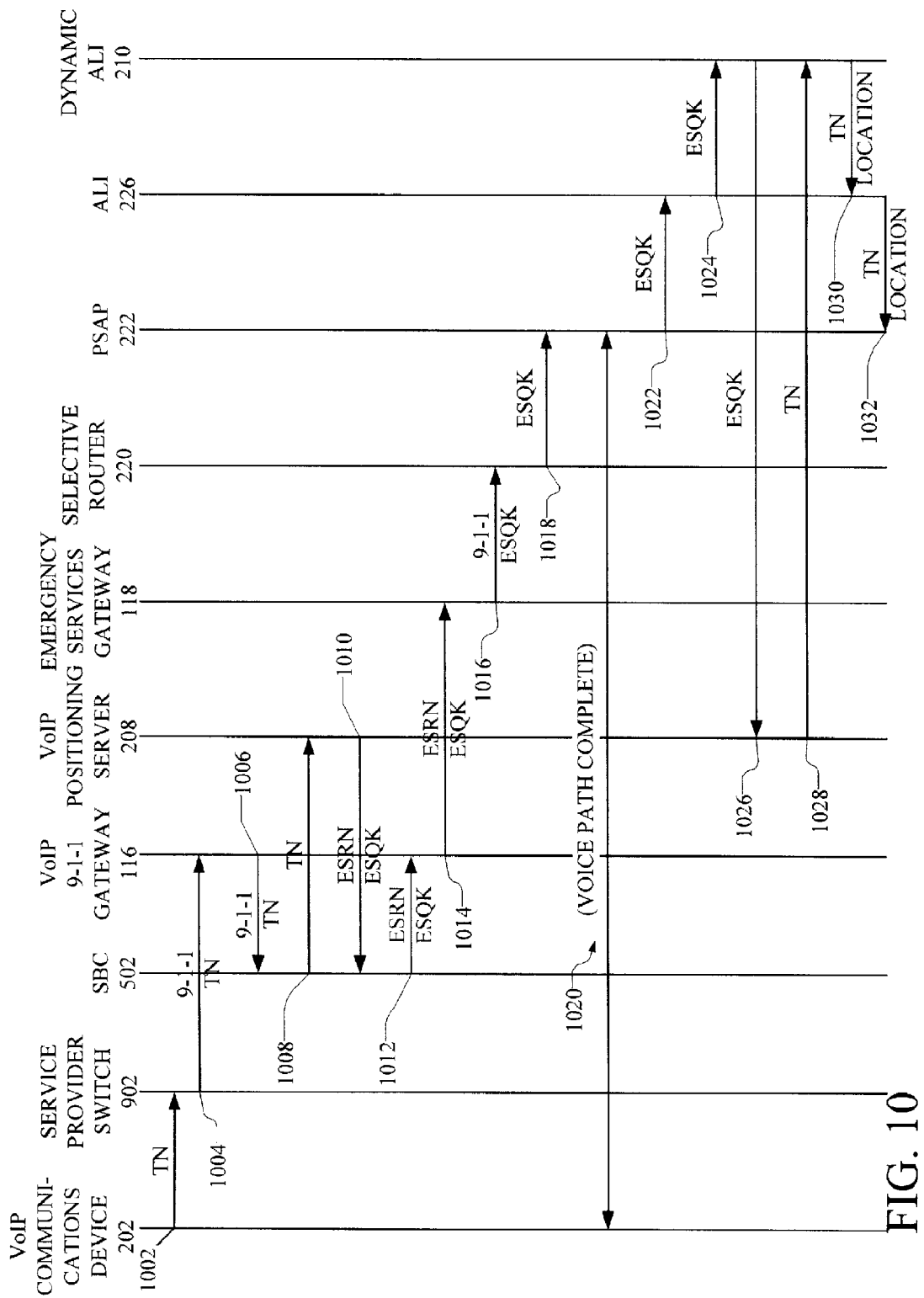
FIG. 10 is a call flow diagram of a special number call from a communications device to its local answering point in the context of FIG. 9, in accordance with still yet another aspect of this invention.

The operation of communications network 100 of FIG. 9 will now be described in the context of the call flow of FIG. 10. In step 1002, VoIP communications device 202 initiates an emergency services call by sending the called number (9-1-1), calling number (TN) and, optionally, its MAC or IP address to service provider switch 902. In this exemplary embodiment, service provider switch 902 recognizes 9-1-1 as requiring special handling, and sets up and delivers the call (including the called number, 9-1-1 and the TN of VoIP communications device 202) via a TDM connection 904 to VoIP 9-1-1 gateway 116 in step 1004.

VoIP 9-1-1 gateway 116 determines how to route the call by delivering the called number (9-1-1) and the calling number (TN) to session border controller 502 in step 1006, which queries VoIP positioning server 208 with the TN of VoIP communications device 202 over link 906 in step 1008. VoIP positioning server 208 responds with an ESRN and an ESQK in step 1010 to session border controller 502, which forwards the ESRN and ESQK to VoIP 9-1-1 gateway 116 in step 1012. Optionally, VoIP 9-1-1 gateway 116 queries VoIP positioning server 208 directly over communications link 508 (shown in phantom). In step 1014, VoIP 9-1-1 gateway 116 selects an emergency service gateway 118 based on the ESRN and forwards the call, including the ESRN and ESQK thereto.

Emergency services gateway 118 routes the call to selective router 220 based on the ESRN, and delivers 9-1-1 as the called number and ESQK as the called number in step 1016. Selective router 220 routes the call to PSAP 222 based on the ESQK in step 1018. In step 1020, the voice path between VoIP communications device 202 and PSAP 222 is complete. PSAP 222 queries its ALI database 226 using the ESQK in step 1022. ALI database 226 queries dynamic ALI 210 with the ESQK in step 1024, which then queries VoIP positioning server 208 with the ESQK in step 1026. In step 1028, VoIP positioning server 208 delivers the TN of VoIP communications device 202 back to dynamic ALI 210. Dynamic ALI 210 delivers the TN and location of VoIP communications device 202 back to ALI 226 in step 1030 and ALI 226 delivers the TN and location of VoIP communications device 220 to PSAP 222 in step 1032.

Figure 11:
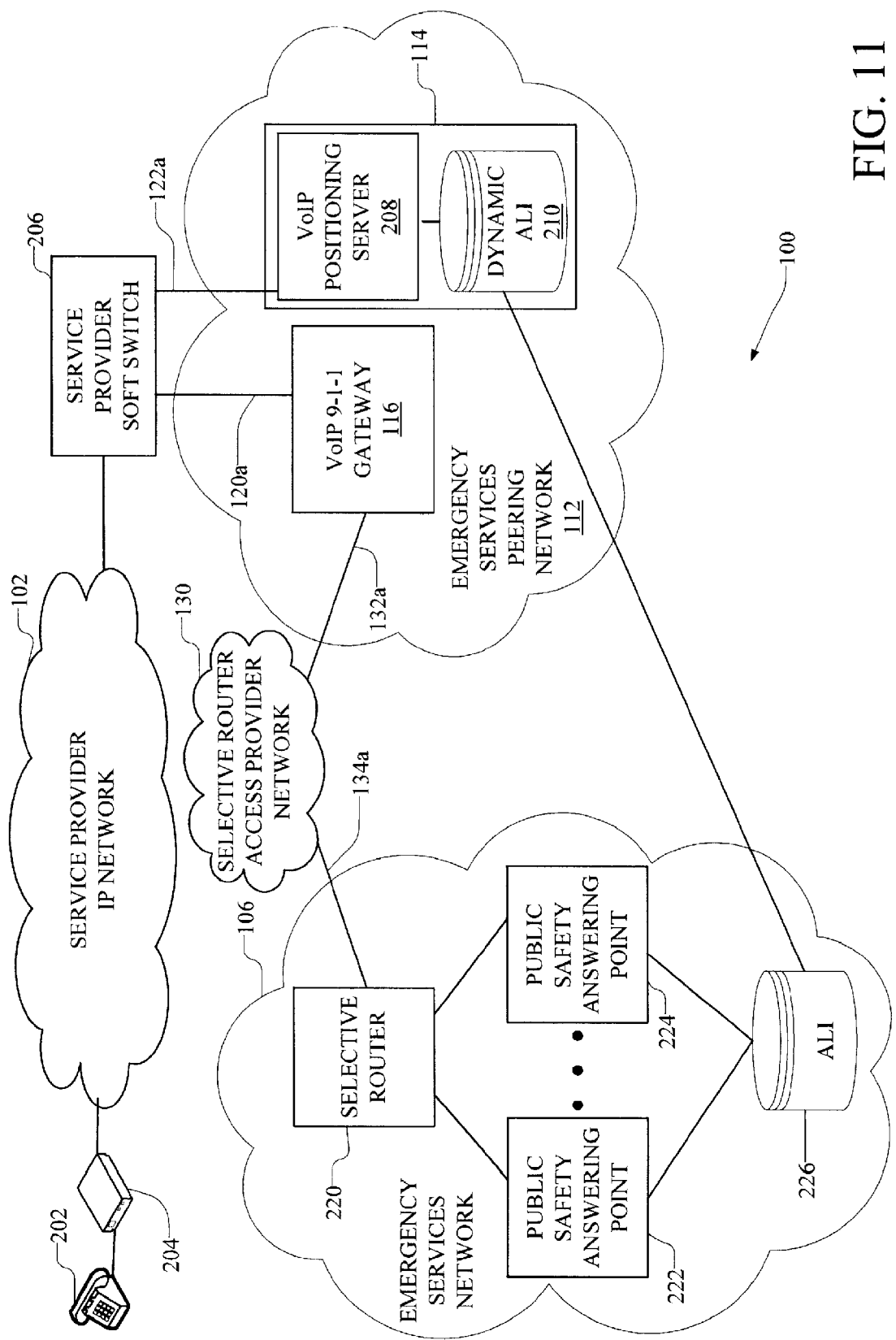
FIG. 11 illustrates a more detailed block diagram of the communications network of FIG. 1 in accordance with yet a further exemplary embodiment of this invention.

FIG. 11 illustrates a more detailed block diagram of the communications network of FIG. 1 in accordance with yet a further exemplary embodiment of this invention. As discussed above, in connection with FIG. 1, emergency services peering network 112 may be connected to one or more emergency services networks (herein represented by emergency services network 106) via selective router access provider network 130. In this exemplary embodiment, service provider soft switch 206 is connected to VoIP 9-1-1 gateway 116 via communications link 120a and to VoIP positioning server 208 in routing and positioning server 114. VoIP 9-1-1 gateway 116 is connected to selective router access provider network 130 via communications link 132a, which, in this exemplary embodiment comprises a data link.

Selective router access provider network 130 comprises one or more switches, routers, soft switches, etc., which routes a call from an originating network to a destination network. Selective router access provider network 130 is connected to emergency services network 106 at selective router 220 via communications link 134a.

The operation of communications network 100 of FIG. 11 will now be described in the context of the call flow of FIG. 12. In step 1202, VoIP communications device 202 initiates an emergency services call by sending the called number (9-1-1), calling number (TN) and, optionally, its MAC or IP address to service provider soft switch 206. In this exemplary embodiment, service provider switch 206 recognizes 9-1-1 as requiring special handling, and queries VoIP positioning server 208 with the TN of VoIP communications device for routing instructions in step 1204. VoIP positioning server 208 returns an ESRN and ESQK in step 1206. In step 1208, service provider soft switch delivers the call (including the ESRN and ESQK) to VoIP 9-1-1 gateway 116.

Figure 12:
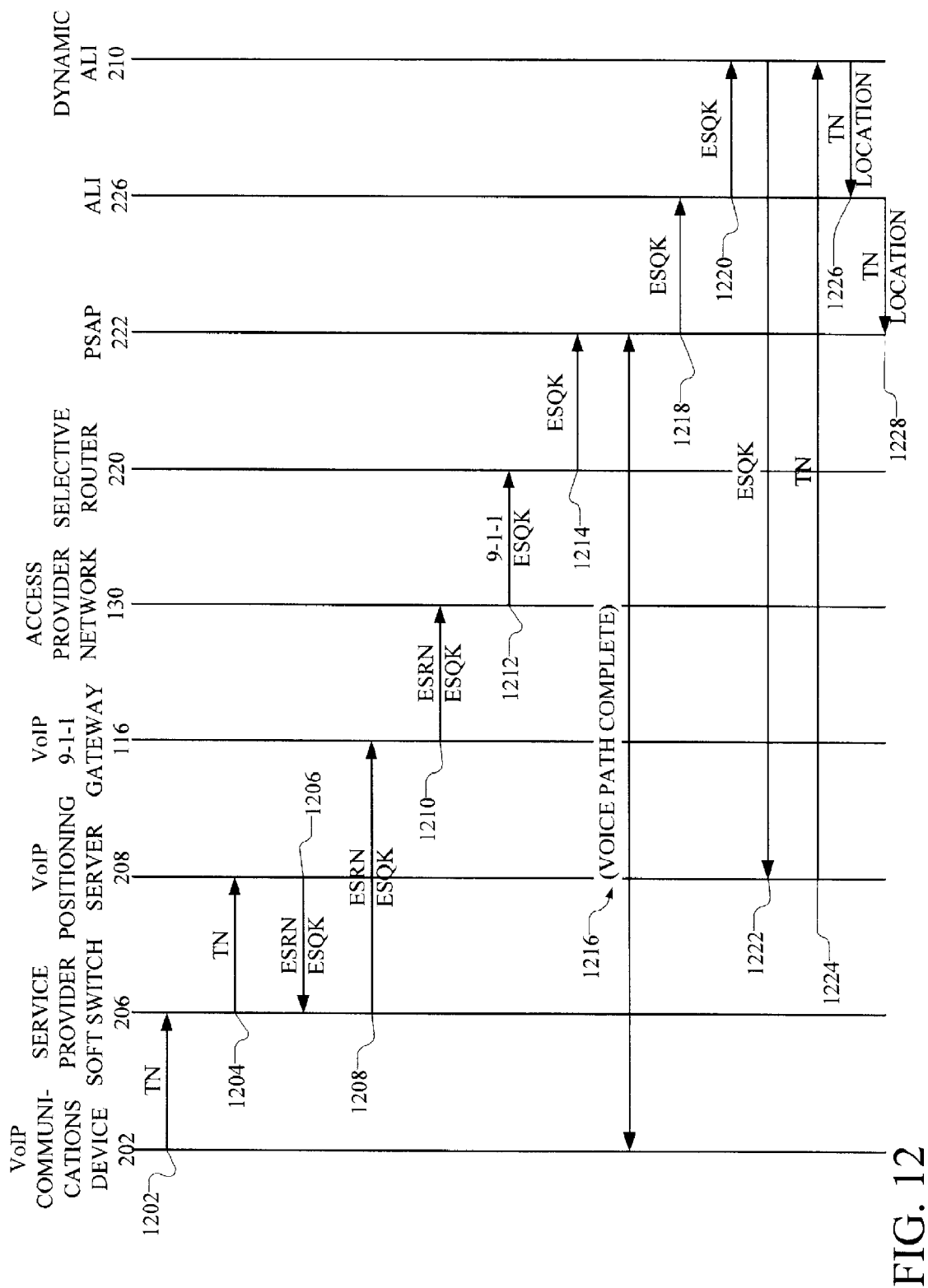
FIG. 12 is a call flow diagram of a special number call from a communications device to its local answering point in the context of FIG. 11, in accordance with still yet a further aspect of this invention.

In the exemplary embodiment of FIGS. 11 and 12 VoIP 9-1-1 gateway 116 extends the call to selective router access provider network 130 (including the ESRN as the called number and ESQK as the called number) over communications link 132a in step 1210. Alternatively, VoIP 9-1-1 gateway 116 may select one of a plurality of emergency services gateways 118 (not shown in FIG. 11 but illustrated in phantom in FIG. 1), which, in turn, extends the call to selective router access provider network 130 over communications link 132b.

In either case, selective router access provider network 130 routes the call to selective router 220 based on the ESRN, and delivers 9-1-1 as the called number and ESQK as the called number in step 1212. Selective router 220 routes the call to PSAP 222 based on the ESQK in step 1214. In step 1216, the voice path between VoIP communications device 202 and PSAP 222 is complete. PSAP 222 queries its ALI database 226 using the ESQK in step 1218. ALI database 226 queries dynamic ALI 210 with the ESQK in step 1220, which then queries VoIP positioning server 208 with the ESQK in step 1222. In step 1224, VoIP positioning server 208 delivers the TN of VoIP communications device 202 back to dynamic ALI 210. Dynamic ALI 210 delivers the TN and location of VoIP communications device 202 back to ALI 226 in step 1226 and ALI 226 delivers the TN and location of VoIP communications device 220 to PSAP 222 in step 1228.

It is to be understood that the above-described embodiment is merely illustrative of the principles of the present invention and that many variations of the above-described embodiments can be devised by one skilled in the art without departing from the scope of the invention. It is therefore intended that such variations be included within the scope of the following claims and their equivalents.

The invention claimed is:

1. A peering network for routing a special number call from a communications device connected to a first communications network to an answering point connected to a second communications network based on a pre-provisioned parameter regarding said communication device, said pre-provisioned parameter comprising one of a plurality of parameters regarding said communication device, said peering network comprising:

a first gateway coupled with a plurality of second gateways and coupled with a parameter server;

said first gateway configured to receive a voice path and one or more of said plurality of parameters regarding said communication device from said first communications network;

said parameter server configured to deliver routing instructions to said first gateway responsive to said parameter server determining that said first gateway delivered said pre-provisioned parameter;

said first gateway further configured to select one of said plurality of second gateways responsive to said parameter server determining that said first gateway delivered said pre-provisioned parameter and to deliver the voice path and a signaling path including the routing instructions to the selected second gateway; and said second gateway configured to connect said voice path and said signaling path to said second communications network; said voice path and said signaling path proceeding from said first gateway to said second communications network via a plurality of network elements substantially simultaneously; at least one of said first gateway and said selected second gateway generating a message to a caller at substantially the same time as one of said voice path and said signaling path is received by at least one selected network element of said plurality of network elements; said message conveying that said special number call is being connected with said at least one selected network element;

wherein said pre-provisioned parameter comprises a location of said communications device; and wherein said special number call is connected with said at least one selected network element as if it were a special number call that originated in said second communications network; and wherein said first gateway comprises a session border controller.

2. A peering network in accordance with claim 1 wherein said communications device comprises a VoIP communications device and said first network comprises a VoIP service provider network.

3. A peering network in accordance with claim 1 wherein said second network comprises the public switched telephone network.

4. A peering network in accordance with claim 1 wherein said voice path is delivered via a time division multiplexed (TDM) link from said first network to said first gateway.

5. A peering network in accordance with claim 1 wherein said voice path is delivered via an Internet Protocol (IP) link from said first network to said first gateway.

6. A peering network in accordance with claim 1 wherein said call is delivered via a primary rate interface (PRI) link from said first network to said first gateway.

7. A peering network in accordance with claim 1 wherein said voice path and said signaling path are delivered from said first gateway to said selected second gateway via an IP link.

8. A peering network in accordance with claim 1 wherein said voice path and said signaling path are delivered from said first gateway to said selected second gateway via a TDM link.

9. A peering network in accordance with claim 1 wherein said voice path and said signaling path are delivered from said selected second gateway to said second communications network via a TDM link.

10. A peering network in accordance with claim 1 wherein said voice path and said signaling path are delivered from said selected second gateway to said second communications network via an IP link.

11. A peering network in accordance with claim 1 wherein said first network further comprises a service provider switch and wherein said service provider switch is configured to connect said voice path of said special number call directly to said first gateway.

12. A peering network in accordance with claim 1 wherein said special number call comprises an emergency services call.

13. A peering network in accordance with claim 12 wherein said second gateway is configured to deliver said voice path and said signaling path to a selective router.

14. A peering network for routing a special number call from a communications device connected to a first communications network to an answering point connected to a second communications network based on a pre-provisioned parameter regarding said communication device, said pre-provisioned parameter comprising one of plurality of parameters regarding said communication device, said peering network comprising:

a first gateway coupled with a session border controller, a plurality of second gateways and a parameter server;

said session border controller configured to receive a voice path and one or more of said plurality of parameters regarding said communication device said parameter from said first communications network;

said parameter server configured to deliver routing instructions to said session border controller responsive to said parameter server determining that said session border controller delivered said pre-provisioned parameter;

said session border controller further configured to deliver the voice path and a signaling path including the routing instructions to said first gateway;

said first gateway configured to select one of said plurality of second gateways and to deliver the voice path and said signaling path to the selected second gateway responsive to said session border controller; and said second gateway configured to connect said voice path and said signaling path to said second communications network; said voice path and said signaling path proceeding from said session border controller to said second communications network via a plurality of network elements substantially simultaneously; at least one of said first gateway, said session border controller and said selected second gateway generating a message to a caller at substantially the same time as one of said voice path and said signaling path is received by at least one selected network element of said plurality of network elements; said message conveying that said special number call is being connected with said at least one selected network element wherein said pre-provisioned parameter comprises a location of said communications device; and wherein said special number call is connected with said at least one selected network element as if it were a special number call originating in said second communications network.

15. A peering network in accordance with claim 14 wherein said communications device comprises a VoIP communications device and said first network comprises a VoIP service provider network.

16. A peering network in accordance with claim 14 wherein said second network comprises the public switched telephone network.

17. A peering network in accordance with claim 14 wherein said call is delivered via an IP link from said first network to said session border controller.

18. A peering network in accordance with claim 14 wherein said voice path and said signaling path are delivered from said session border controller to said first gateway and from said first gateway to said selected second gateway via an IP link.

19. A peering network in accordance with claim 14 wherein said voice path and said signaling path are delivered from said selected second gateway to said second communications network via a TDM link.

20. A peering network in accordance with claim 14 wherein said voice path and said signaling path are delivered from said selected second gateway to said second communications network via an IP link.

21. A peering network in accordance with claim 14 wherein said first network further comprises a service provider switch and wherein said service provider switch is configured to connect said voice path of said special number call directly to said first gateway.

22. A peering network in accordance with claim 14 wherein said special number call comprises an emergency services call.

23. A peering network in accordance with claim 22 wherein said second gateway is configured to deliver said voice path and said signaling path to a selective router.

\* \* \* \* \*